Dec. 15, 1925.                                            1,566,029
                     J. W. MACKLIN
                 TIRE AND RIM CONSTRUCTION
                   Filed Dec. 15, 1923
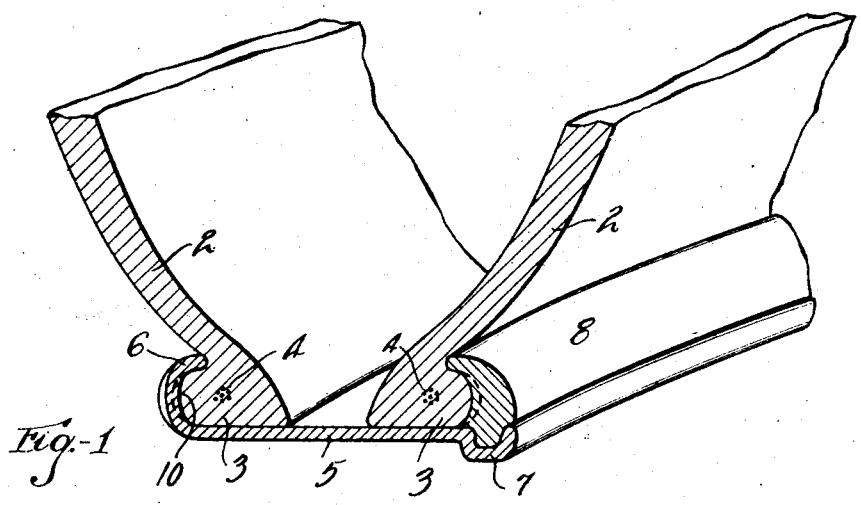
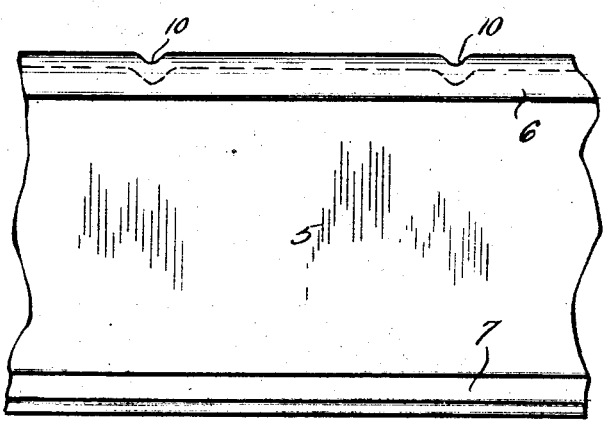
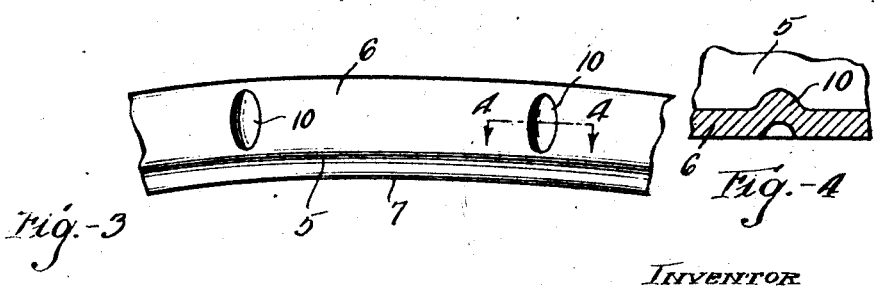

Patented Dec. 15, 1925.

1,566,029

UNITED STATES PATENT OFFICE.

JUSTIN W. MACKLIN, OF LAKEWOOD, OHIO, ASSIGNOR TO JACKSON D. COMSTOCK, OF CHESTER, WEST VIRGINIA.

TIRE AND RIM CONSTRUCTION.

Application filed December 15, 1923. Serial No. 680,839.

*To all whom it may concern:*

Be it known that I, JUSTIN W. MACKLIN, a citizen of the United States, residing at Lakewood, in the county of Cuyahoga and State of Ohio, have invented a certain new and useful Improvement in a Tire and Rim Construction, of which the following is a full, clear, and exact description, reference being had to the accompanying drawings.

This invention relates to tire and rim constructions and is particularly concerned with provision of means on the rim for the preventing of relative circumferential movement between the tire and rim when the tire is inflated, with the result that consequent rim cutting at the in-turned edges of the rim flanges is avoided. The invention is particularly applicable to separable tires and rims of the clincher type where it has been found that the creeping of the casing on the rim when inflated results in causing the edge of the rim to cut into the side wall of the rim just above the bead. This cutting action is frequently assumed to result from the flexing of the wall over the edge of the bead but I have found that if creeping is prevented, this rim cutting is largely if not entirely elminated, so that it is not a serious factor throughout the normal life of a tire casing.

A more specific object of the invention, therefore, is to provide a simple and effective means which may be applied to standard well known types of clincher rims without interfering with standard practice of tire and rim manufacturers and which may be embodied in rim constuctions with a minimum of expense.

My invention is more fully described in connection with the accompanying drawings illustrating a preferred embodiment thereof. The essential characteristics are summarized in the claim.

In the drawings Fig. 1 is a fragmentary perspective of a clincher rim having a removable side ring with the casing in position thereon; Fig. 2 is a plan of a portion of a rim; Fig. 3 is a side elevation of a section of a removable ring; Fig. 4 is a detailed section of the same taken substantially on the line 4—4 of Fig. 3.

It has heretofore been proposed to provide projections or roughened surfaces on tires and rims to prevent creeping. Such proposals either involve great expense or are not practicably applicable to modern tire and rim construction. A co-pending application filed by the applicant hereof, Serial No. 680,838 filed October 13th, 1923, embodies in a general way the principle of the present invention. However, the prevention of creeping of clincher tires with the consequent rim cutting, presents a materially different problem and affords difficulties which have been successfully eliminated by the present invention.

Designating the parts shown by the use of reference characters and referring to the particular embodiments shown, 1 indicates a clincher tire casing having firm, hardened and thickened portions forming clincher type of beads as indicated at 3. 5 indicates a rim shown as having an upwardly and inwardly turned flange at 6, at one side, while at the other side is a depressed channel in which is seated the flange of a removable clincher ring 8. The clincher type of bead for any one size of tire is comparatively standard for the product of a large number of different manufacturers. Correspondingly, the shapes and sizes of rims for a given size of tire are comparatively standard. The commercial results, however, vary materially and the rigid bead portion seldom fits tightly throughout its entire area into any one type of bead. The result is that the side pressure, due to the internal air pressure within the casing, frequently is resisted by the contact only along the inwardly turned edge of the rim flanges or rim rings. More often there is slight contact only at the inner corner or lip of the bead. Under such circumstances, the creeping relative circumferential movement of the tire causes this in-turned edge of the flange, thus pressed very forcibly into the casing above the bead and at a weakened portion of the casing, to cut.

To eliminate this, I provide inwardly extending projections within the hollow of the flanges of sufficient size to be forced into cavities in the beads, regardless of the commercial variation and resulting poor fit of the beads within the flanges. Such projections are indicated in the rim flange 6 at 10, the inner surface of which merges with the flange just above the base and just below the upper inner edge of the flange. They may be arranged at suitable intervals, preferably two or three inches apart through the circumference of the ring.

In some form of clincher rims, both flanges of the rim are integral and in such cases the projections 10 may be alike on either side thereof. Where the rim, however, is formed to receive tires having nonextensible beads provided with metal bead rings 4, as shown, a removable side flange is used in the form of the ring 8. In rolling this comparatively thick metal to form the ring, inward projections may be formed thereon, as shown at 20. These projections preferably merge with the inner surface above the base of the rim and below the upper in-turned edge of the ring. It will be seen that, when the internal pressure is applied, the tendency of the tire to expand in all directions away from the base of the rings gives a resultant of latent pressure on the beads and draws the edges of the flanges very tightly against the side wall just above the bead. This same side pressure, however, will cause the projections to be forced into the thick filler portion of the bead depressions, embracing the projections and serving to provide in effect, shoulders resisting circumferential relative movement in either direction.

It will be seen that even though the beads do not normally fit tightly and seat firmly, but stand away from the flange surfaces, the projections are of sufficient size to form depressions therein due to the internal pressure. Thus, without interfering with standard practice and in fact while allowing for irregularities that necessarily occur, I am enabled to provide a means certain to prevent creeping of the casing on the rim. As a practical result greatly eliminating if not diminishing the rim cutting resulting from the creeping on rims of this construction.

Various modifications may be made of this general arrangement accomplishing the results described without departing from the spirit of my invention.

Having thus described my invention, what I claim is:

The combination with a clincher tire casing and a clincher rim, of means for preventing creeping and consequent rim cutting, said means consisting of inwardly projecting ridges on the inner side of the flange above the base and opposite the convex portion of the bead and adapted to form a cavity in the bead as the bead is forced toward the flange by the internal pressure within the casing.

In testimony whereof, I hereunto affix my signature.

JUSTIN W. MACKLIN.